(12) United States Patent
Salsbury

(10) Patent No.: US 9,796,346 B2
(45) Date of Patent: Oct. 24, 2017

(54) MOTOR VEHICLE PLASTIC PANEL HAVING AN INTEGRAL ELECTRICAL UNIT

(71) Applicant: Ford Global Technologies, LLC, Dearborn, MI (US)

(72) Inventor: Ian Salsbury, Wickford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 14/293,887

(22) Filed: Jun. 2, 2014

(65) Prior Publication Data

US 2014/0355224 A1 Dec. 4, 2014

(30) Foreign Application Priority Data

Jun. 4, 2013 (GB) .................................. 1309956.9

(51) Int. Cl.
*H05K 7/00* (2006.01)
*B60R 16/02* (2006.01)
*H01R 13/60* (2006.01)

(52) U.S. Cl.
CPC ......... *B60R 16/0207* (2013.01); *H01R 13/60* (2013.01)

(58) Field of Classification Search
USPC ........................................ 361/760, 748, 772
See application file for complete search history.

(56) References Cited

U.S. PATENT DOCUMENTS

| 4,848,829 A | 7/1989 | Kidd |
| 4,997,187 A * | 3/1991 | Smollar .............. A63H 18/026 238/10 E |
| 6,364,670 B1 | 4/2002 | Wickett et al. |
| 6,428,081 B1 | 8/2002 | Williams, Jr. et al. |
| 6,483,048 B1 | 11/2002 | Bontrager et al. |
| 2003/0156397 A1 | 8/2003 | Preissl et al. |

(Continued)

FOREIGN PATENT DOCUMENTS

| EP | 0775613 A | 5/1997 |
| EP | 0812282 A1 | 12/1997 |

(Continued)

OTHER PUBLICATIONS

Intellectual Property Office, Search Report for the corresponding Great Britain Patent Application No. GB1309956.9 dated Dec. 19, 2013.

(Continued)

*Primary Examiner* — Andargie M Aychillhum
(74) *Attorney, Agent, or Firm* — Frank MacKenzie; Brooks Kushman, P.C.

(57) ABSTRACT

A plastic panel forming part of a motor vehicle is disclosed having a number of embedded conductors for electrically connecting together an electrical connector and an electrical unit. Parts of the electrical connector and the electrical unit are formed as integral parts of the plastic panel. The electrical connector includes terminals connected to the electrical conductors for co-operation with terminals formed as part of a plug used to connect the conductors to other electrical circuits of the motor vehicle. In one embodiment the electrical unit is in the form of a fuse box having electrical terminals held in position by the plastic panel and in pairs for cooperation with a respective fuse.

12 Claims, 5 Drawing Sheets

(56) References Cited

U.S. PATENT DOCUMENTS

| | | | | |
|---|---|---|---|---|
| 2005/0090154 A1* | 4/2005 | Ikeda | ............... | H01R 9/245 |
| | | | | 439/709 |
| 2007/0076383 A1* | 4/2007 | Sasaki | ............... | H05K 5/063 |
| | | | | 361/752 |
| 2011/0155456 A1* | 6/2011 | Li | ............... | H02S 40/34 |
| | | | | 174/565 |

FOREIGN PATENT DOCUMENTS

| | | |
|---|---|---|
| EP | 1669279 A1 | 6/2006 |
| FR | 2825055 A1 | 11/2002 |
| GB | 2356837 A | 6/2001 |
| WO | 2008137671 A1 | 11/2008 |

OTHER PUBLICATIONS

Intellectual Property Office, Search Report for the corresponding Great Britain Patent Application No. GB1401156.3 dated Aug. 27, 2014.

* cited by examiner

MOTOR VEHICLE PLASTIC PANEL HAVING AN INTEGRAL ELECTRICAL UNIT

CROSS-REFERENCE TO RELATED APPLICATIONS

This application claims foreign priority benefits under 35 U.S.C. §119(a)-(d) to GB 1 309 956.9 filed Jun. 4, 2013, which is hereby incorporated by reference in its entirety.

TECHNICAL FIELD

This invention relates to motor vehicles and, in particular, to a plastic panel of a motor vehicle having an integral electrical unit forming part of an electric circuit of the motor vehicle.

BACKGROUND

It is well known to provide a motor vehicle with many electric circuits to connect electrical or electronic devices associated with the motor vehicle to a source of electrical power located on the motor vehicle. It is further known to provide such circuits by means of a wiring loom comprising a number of separately insulated conductors bundled together to form a rope like structure. A wiring loom is also commonly referred to as a wire harness or a cable harness.

Such wiring looms are expensive to manufacture and difficult to install on the vehicle. Furthermore, due to their increased size and complexity, required to interconnect the many electronic modules commonly used in a modern motor vehicle, they have become increasingly difficult to package on the motor vehicle.

It is a further problem with current practice that the connection and/or assembly of the various electrical components and electronic modules to the motor vehicle is time consuming and expensive.

For example and without limitation, U.S. Pat. No. 6,364, 670 discloses a fuse box for supporting a number of fuses and/or relays. The fuse box is of a complex construction and requires not only the assembly of various components to form the fuse box but also the subsequent mounting of the fuse box onto the motor vehicle. The production of such a fuse box is therefore relatively expensive and time consuming.

It is an object of the invention to provide an apparatus for overcoming the aforesaid problems that is of economical construction and reduces assembly time.

SUMMARY

According to a first aspect of the invention there is provided a motor vehicle plastic panel formed from a single sheet of plastic material, wherein a number of electrical conductors are embedded within the plastic material forming the plastic panel, an electrical unit is at least partially formed as part of the plastic panel, the electrical unit is one of a fuse box and an electronic module and the electrical conductors are connected to the electrical unit.

The plastic panel may be a structural panel of the motor vehicle.

The electrical unit may be a fuse box and the fuse box may include a number of pairs of terminals with each terminal being connected to a respective one of the embedded conductors.

The electrical unit may be a fuse box and the fuse box may include a number of integrally formed latching means for use in attaching a cover to the fuse box.

Alternatively, the electrical unit may be an electronic module and the electronic module may include a module connector for connecting the electronic module to the conductors and the module connector is formed as an integral part of the plastic panel.

The module connector may include a number of terminals and each terminal may be connected to a respective one of the embedded conductors.

The electronic module may include a number of electrical contacts and each electrical contact may cooperate in use with a respective one of the module connector terminals.

A module fastening means may be formed as an integral part of the plastic panel and the module fastening means may cooperate in use with the electronic module to retain the electronic module on the plastic panel.

In either case, the plastic panel may further comprise an electrical connector used to connect the electrical conductors to one or more electrical circuits of the motor vehicle and the electrical connector may be formed, at least partially, as part of the plastic panel and may be connected to the electrical unit by the embedded conductors.

The electrical connector may include a number of terminals and each terminal may be connected to a respective one of the embedded conductors.

The terminals may be female terminals for co-operation in use with male terminals formed as part of a plug.

The invention will now be described by way of example with reference to the accompanying drawing of which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The figures are diagrammatic in nature, are not drawn to scale and do not represent production ready components.

Figure 10:
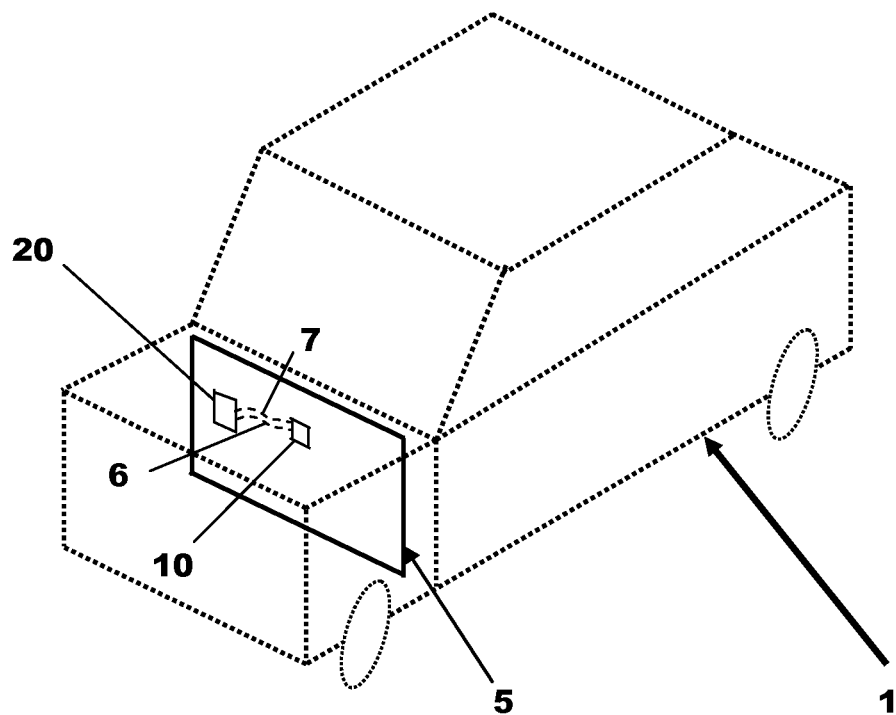
FIG. 10 is a pictorial view of a motor vehicle according having a plastic panel constructed in accordance with the invention.

With reference to FIG. 10 there is shown in dotted outline a motor vehicle 1 having a structural plastic panel 5 in the form of a plastic bulkhead. The plastic panel 5 is formed from a single sheet of plastic material in which a number of electrical conductors 6, 7 are embedded so that the plastic material forms an electrical insulating layer around each conductor. The electrical conductors 6, 7 are used to electrically interconnect an electrical connector 10 and an electrical unit in the form of a fuse box 20. The electrical connector 10 is used to connect the electrical conductors 6, 7 to other electrical circuits (not shown) of the motor vehicle 1 by means of a plug (not shown) that is engageable with the electrical connector 10.

Figure 1A:
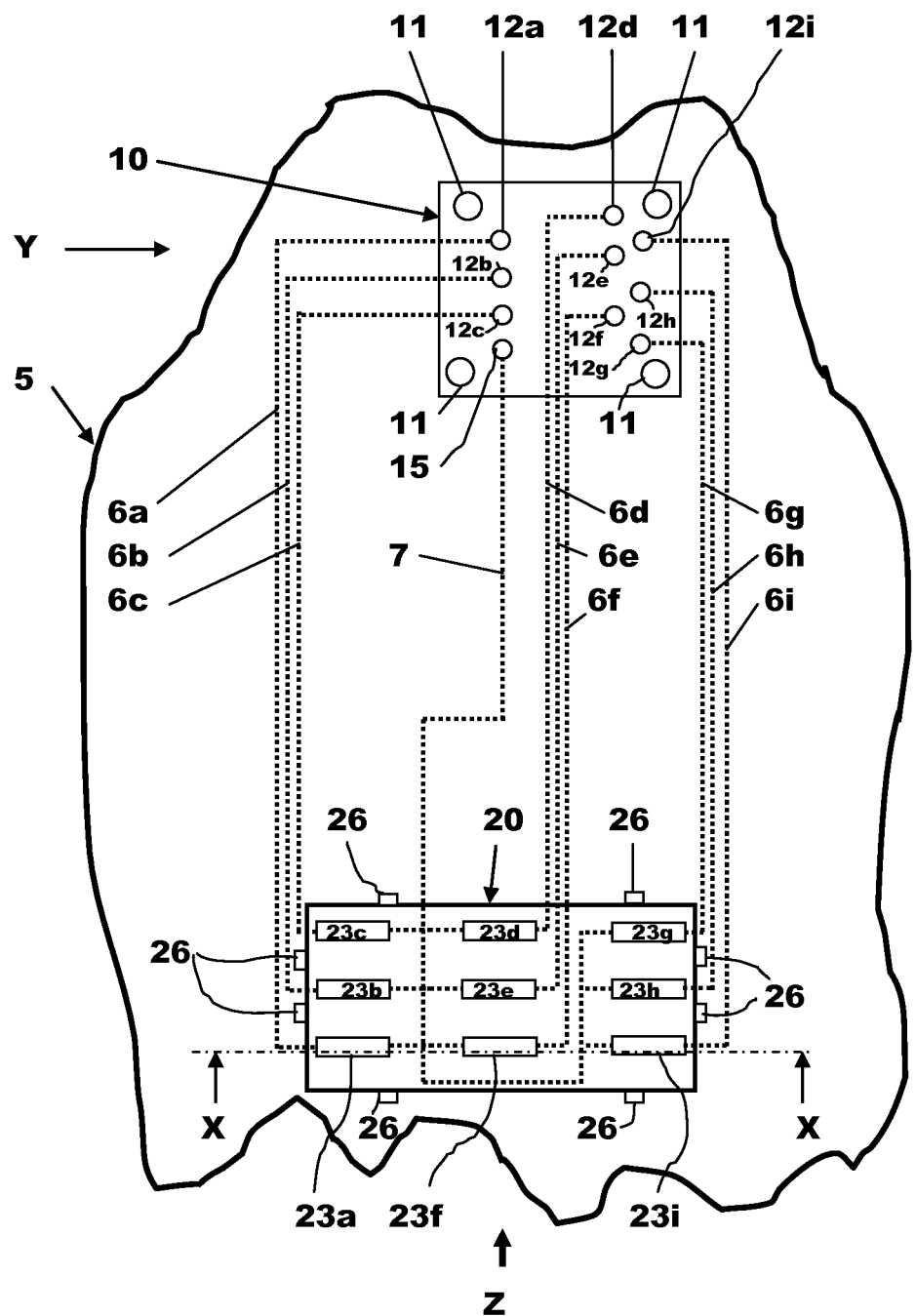
FIG. 1A is a plan view of part of a motor vehicle plastic panel according to a first embodiment of the invention.
Figure 1B:
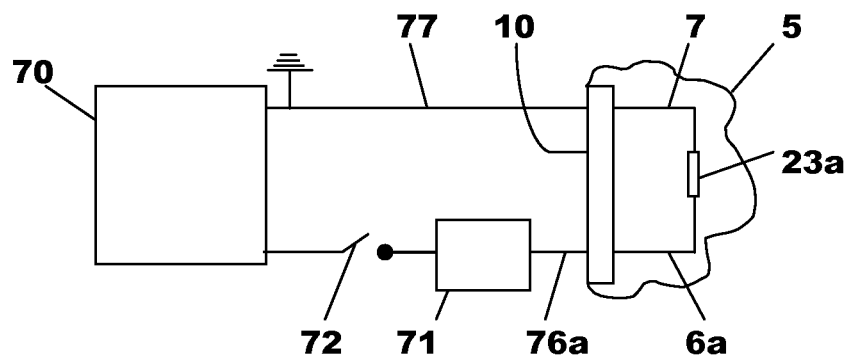
FIG. 1B is a schematic diagram of an electrical circuit of which the plastic panel shown in FIG. 1A forms a part.

FIG. 1B shows one electrical circuit of the motor vehicle 1. The electrical circuit includes a source of electrical power such as a battery 70, a common earth 77, a switch 72, an electrical load 71 connected to the battery via a power line 76a, the electrical connector 10 formed as an integral part of the plastic panel 5, a fuse 23a, an earth conductor 7 and a power conductor 6a. The earth conductor 7 and the power conductor 6a are as previously referred to both embedded within the plastic panel 5 so that no electrical insulation is required for either of these components. As is well known in the art, when the switch 72 is closed, current will flow through the load 71 as demanded by the load 71. If the current is excessive then the fuse 23a will fail thereby protecting the load 71 from damage.

Referring now to FIGS. 1A, 2, 3A, 3B, 4 and 5 there is shown in more detail the plastic body panel 5.

The electrical connector 10 is formed as an integral part of the plastic panel 5 and includes a number of female terminals 12a to 12i, 15 held in position by the plastic material from which the plastic panel 5 is made. The female terminals 12a to 12i, 15 co-operate in use with male terminals formed as part of a plug (not shown) to connect the plastic panel to other electrical circuits on the motor vehicle 1. It will be appreciated that the opposite construction having male terminals formed as part of the connector 10 and female terminals on the plug could be used and that the invention is not limited to the use of female terminals 12a to 12i, 15 in the connector 10. The connector 10 also includes four threaded metal inserts 11 held in place by the surrounding plastic of the plastic panel 5. The inserts 11 are provided to enable the plug to be held in engagement with the connector 10 when in use. It will be appreciated that alternative fastening means could be provided as part of the connector 10 such as for example one half of a snap lock fastener.

Figure 2:
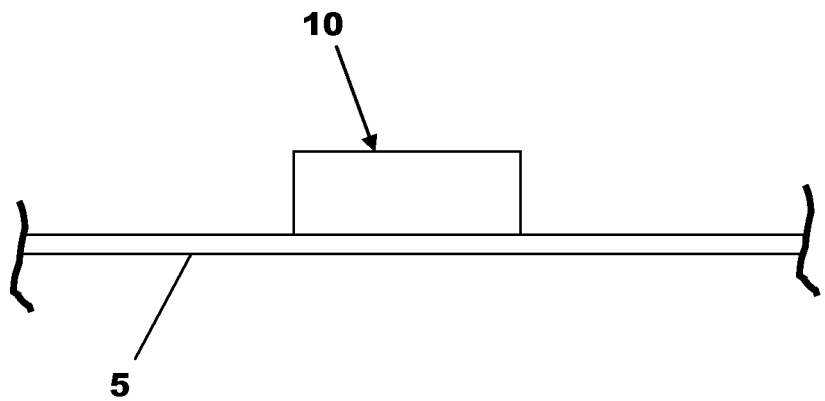
FIG. 2 is a side view in the direction of arrow 'Y' on FIG. 1A of an electrical connector forming part of the plastic panel shown in FIG. 1A.
Figure 3A:
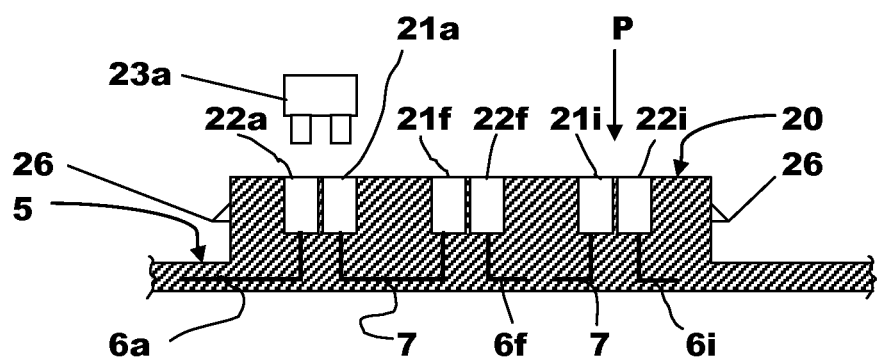
FIG. 3A is a scrap cross-section on the line X-X on FIG. 1A through a fuse box forming part of the plastic panel shown in FIG. 1A with a fuse in position ready for insertion into the fuse box.
Figure 4:
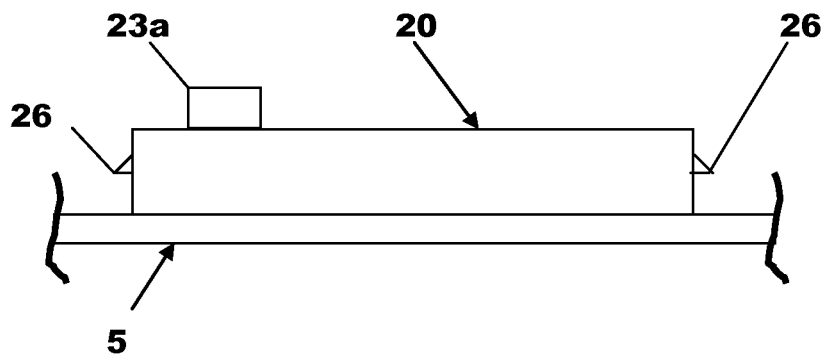
FIG. 4 is an end view in the direction of arrow 'Z' on FIG. 1A of the fuse box with the fuse shown in FIG. 3A inserted into the fuse box.
Figure 5:
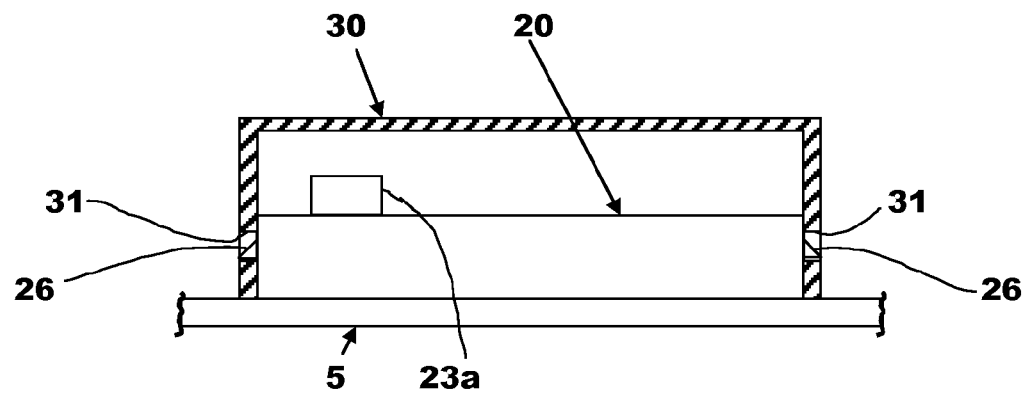
FIG. 5 is a view similar to that of FIG. 4 but showing in cross-section a cover for the fuse box attached to the fuse box.

As shown in FIG. 2, the thickness of the plastic material forming the plastic panel 5 is thicker in the region of the connector 10 so as to provide space for the terminals 12a to 12i, 15 and to form a connector block with which a plug can be engaged.

Each of the terminals 12a to 12i, 15 is electrically connected to one end of a respective electrical conductor 6a to 6i, 7. The electrical conductors 6a to 6i, 7 are embedded within the plastic panel 5 so that the plastic material from which the plastic panel 5 is formed acts as an insulator for the conductors 6a to 6i, 7. The conductors 6a to 6i, 7 are shown as dotted lines on FIG. 1A to indicate that they are hidden detail.

The conductors 6a to 6i are all power conductors and the conductor 7 is a common earth or return. The conductors 6a to 6i and 7 are arranged to electrically connect the connector 10 to an electrical unit which in this example is a fuse box 20 for the motor vehicle 1.

Figure 3B:
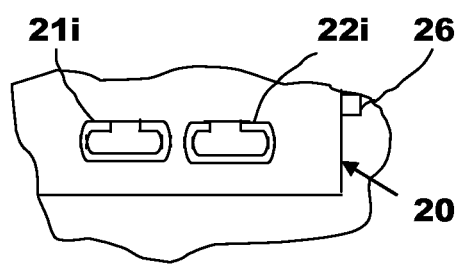
FIG. 3B is a view in the direction of arrow 'P' on FIG. 3A showing one pair of fuse box terminals.

The fuse box 20 has in this case nine pairs of terminals 21a to 21i and 22a to 22i arranged in two rows of three fuse pairs 21a, 22a; 21b, 22b; 21c, 22c; 21d, 22d; 21e, 22e; 21f, 22f; 21g, 22g; 21h, 22h; 21i, 22i. As shown in FIG. 3B, each of the terminals 21a, 22a; 21b, 22b; 21c, 22c; 21d, 22d; 21e, 22e; 21f, 22f; 21g, 22g; 21h, 22h; 21i, 22i is a substantially C-shaped terminal. Each pair of terminals includes a return terminal 21a to 21i and a power terminal 22a to 22i. All of the return terminals 21a to 21i are electrically connected to the common return conductor 7. Each of the power terminals 22a to 22i is connected to a respective one of the power conductors 6a to 6i. In use a fuse 23a to 23i having two blades joined by a fuse element is engaged with each pair of terminals 21a, 22a; 21b, 22b; 21c, 22c; 21d, 22d; 21e, 22e; 21f, 22f; 21g, 22g; 21h, 22h; 21i, 22i such that one blade engages with the respective return terminal 21a to 21i and the other blade engages with the respective power terminal 22a to 22i. It will be appreciated that each fuse 23a to 23i could having a different arrangement for engaging with the pairs of terminals 21a, 22a; 21b, 22b; 21c, 22c; 21d, 22d; 21e, 22e; 21f, 22f; 21g, 22g; 21h, 22h; 21i, 22i and the invention is not limited to the use of blade fuses.

The connector terminals 12a to 12i and/or the fuse box terminals 22a to 22i could be formed as part of the electrical conductor 6a to 6i used to interconnect them or could be formed as separate components mechanically and electrically joined to the respective conductor 6a to 6i.

It will be appreciated that all of the terminals 12a to 12i; 21a to 21i; 22a to 22i and the conductors 6a to 6i, 7 could all be stamped from a single sheet of conductive material such as copper or aluminum sheet.

The thickness of the plastic forming the plastic panel 5 is thicker in the region of the fuse box 20 so as to provide space for the terminals 21a, 22a; 21b, 22b; 21c, 22c; 21d, 22d; 21e, 22e; 21f, 22f; 21g, 22g; 21h, 22h; 21i, 22i and to form a rigid structure with which a cover 30 (see FIG. 5) can be engaged. The cover 30 is in this case held in position by means of a number of projections 26 formed as part of the fuse box 20. The projections 26 are engageable with apertures 31 in the cover 30 to form in combination a number of snap lock fasteners which hold the cover 30 in place.

The cover 30 is made from a flexible resilient plastic material so as to allow it to be readily engaged with the projections 26. It will be appreciated that the cover 30 could have projections for engagement with recess formed in the fuse box 20 or some other fixing means could be used for the cover 30.

In use, the fuse box 20 is connected to other circuits of the motor vehicle 1 by plugging a plug into the connector 10 which is electrically coupled to the spaced apart fuse box 20 via the embedded conductors 6a to 6i and 7. Therefore wiring between the fuse box 20 and the other circuits of the motor vehicle 1 is reduced and, because the connector 10 and the fuse box 20 are formed as integral parts of the plastic panel 5, no addition assembly of these components 10, 20 onto the plastic panel 5 is required.

Furthermore, because the plastic panel 5 is made from a material that is an electrical insulator, no addition insulation is required to be applied to the individual conductors 6a, 6b, 6c, 6d, 6e, 6f, 6g, 6h, 6i and 7 thereby saving weight, time and reducing cost.

Figure 6:
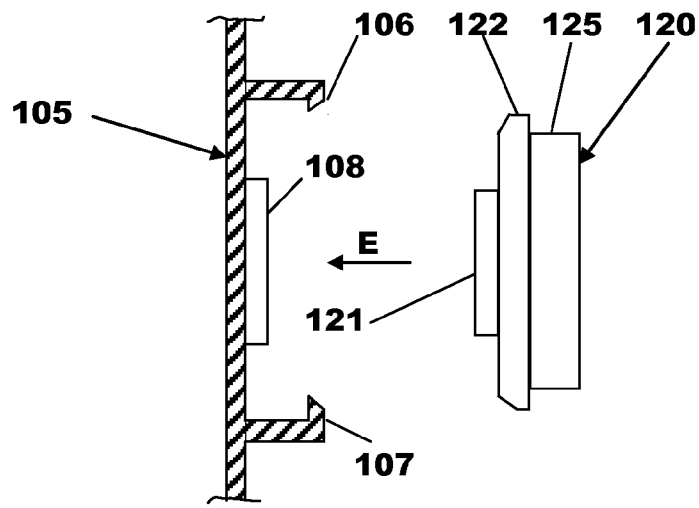
FIG. 6 is an exploded end view of part of a motor vehicle plastic panel according to a second embodiment of the invention showing an electronic module prior to connection to the plastic panel.
Figure 7:
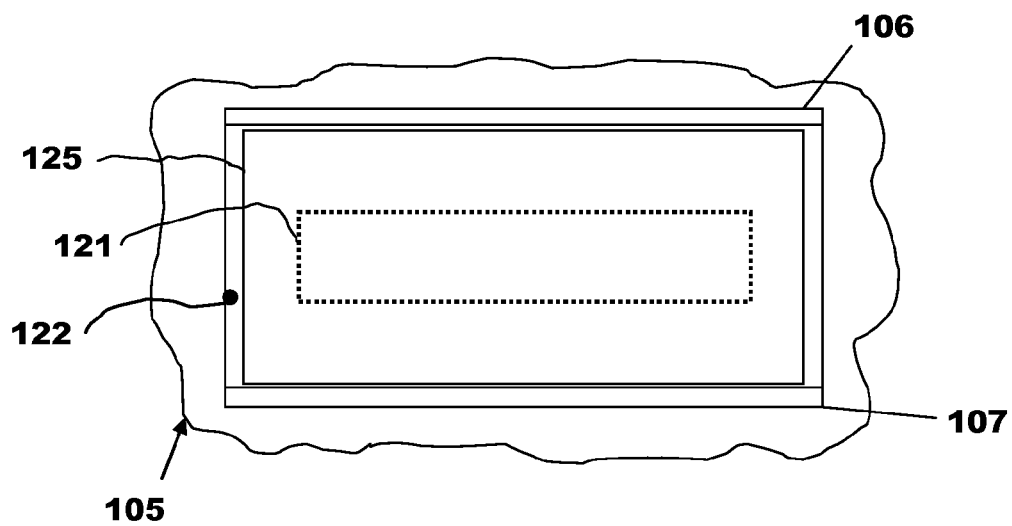
FIG. 7 is a plan view the motor vehicle plastic panel according to the second embodiment of the invention showing the electronic module in position on the plastic panel.

With reference to FIGS. 6 and 7 there is shown part of a second embodiment of plastic panel 105 for use on the motor vehicle 1 according to the invention. That is to say, the plastic panel 105 is formed from a single sheet of plastic material in which a number of electrical conductors are embedded so that the plastic material forms an electrical insulating layer around each conductor. The primary difference between this embodiment and that previously described is that in this case the electrical unit is not a fuse box but rather is an electronic module 120. As before there is a connector formed as an integral part of the plastic panel 105 and the electrical conductors are embedded in the plastic panel 105 so as to electrically couple the connector to the electronic processor 120.

In this case the electronic module 120 is in the form of a microprocessor unit 125 mounted on a base or support 122. A plug 121 is fastened to or is formed as part of the base 122 to connect the microprocessor unit 125 to other circuits on the motor vehicle 1. The plug 122 is engageable with a module connector 108 formed as an integral part of the plastic panel 105. As with the first embodiment a number of terminals (not shown) are located within the module connector 108 and are held in place by the plastic material forming the module connector 108. The terminals are arranged for co-operation with corresponding terminals formed in the plug 121.

A pair of L-shaped retaining arms 106, 107 is formed as part of the plastic panel 105. When the electronic module 120 is brought into engagement with the retaining arms 106, 107 by moving it in the direction of arrow 'E' on FIG. 6, the two arms 106, 107 move apart and then spring back to hold the plug 121 engaged with the module connector 108.

Therefore, as before, the amount of free wiring is reduced by using embedded conductors and there is no need to attach the module connector 108 to the plastic panel 105 thereby saving assembly time and reducing cost. In addition, no additional fixing means are required for the microprocessor unit 125 because the two retaining arms 106, 107 are formed as an integral part of the plastic panel 105.

Figure 8:
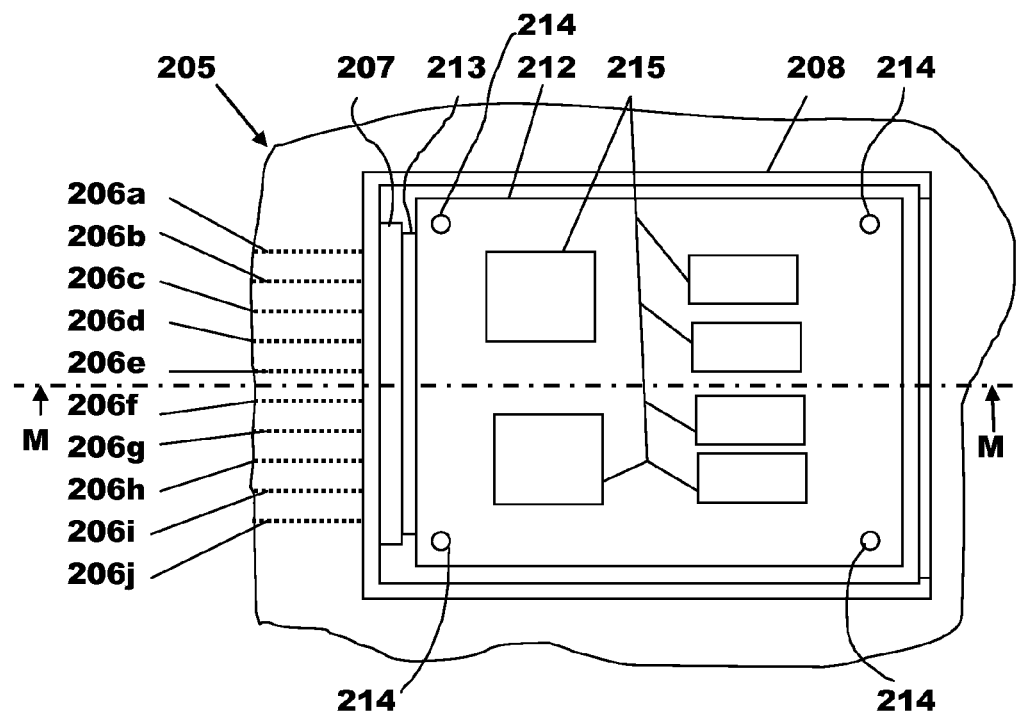
FIG. 8 is a plan view of part of a motor vehicle plastic panel according to a third embodiment of the invention.
Figure 9:
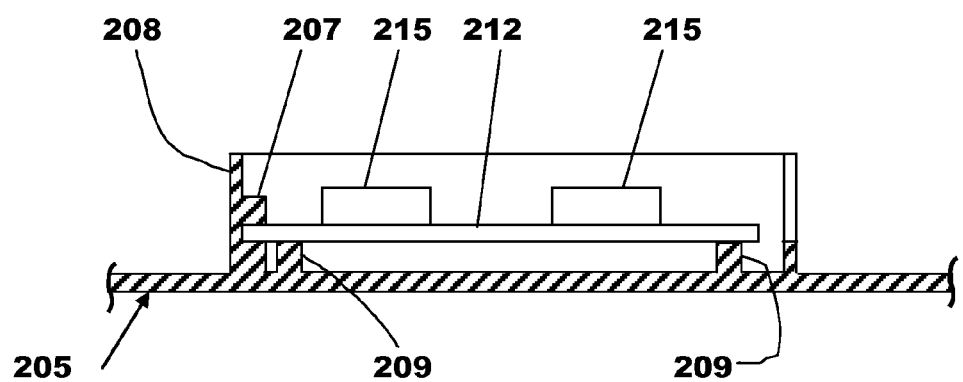
FIG. 9 is a scrap cross-section on the line M-M on FIG. 8 showing an electronic module in position on the plastic panel.

With reference to FIGS. 8 and 9 there is shown a third embodiment of plastic panel 205 for use on the motor vehicle 1. As before the plastic panel 205 is formed from a single sheet of plastic material in which a number of electrical conductors 206a to 206j are embedded so that the plastic material forms an electrical insulating layer around each conductor 206a to 206j. The electrical conductors 206a to 206j are connected at one end to a like number of electrical terminals (not shown) formed as part of a module connector 207. As before the conductors 206a to 206j are shown as dotted lines to indicate that they are hidden detail.

The module connector 207 is formed as an integral part of the plastic panel 205 so that no additional assembly is required and the positioning of the connector 207 and its associated terminals can be accurately controlled during manufacture of the plastic panel 205.

An electronic module in the form of a printed circuit board 212 having a number of electronic components 215 mounted thereon is connectable to the module connector 207 via an edge connector 213 formed as part of the printed circuit board 212. A housing 208 for the printed circuit board 212 is formed as an integral part of the plastic panel 205 as are four pegs 209 of which only two are visible on FIG. 9. One end wall of the housing 208 is relieved so as to allow the edge connector 213 on the printed circuit board 212 to be engaged with the module connector 207. A cover (not shown) is fitted to the housing 208 in use to prevent damage occurring to the printed circuit board 212 and its associated components 215. The printed circuit board 212 is supported and held in position by the four pegs 209. Each of the pegs 209 is engaged with a respective hole 214 in the printed circuit board 212.

The housing 208 may include projections or recesses to form in combination with corresponding recesses and projections on the cover a number of snap fasteners for holding the cover in position on the housing 208 or other means may be used to hold the cover in position on the housing 208.

As shown on FIG. 1A, the ends of embedded conductors 206a to 206j opposite from where they are connected to the module connector 207 may be connected to terminals formed as part of an integral main panel connector, which could be similar to the connector 10 shown on FIG. 1A or could be an edge connector.

The embedded conductors are therefore used to connect the electronic module to other circuits of the motor vehicle thereby eliminating the need for loose wiring such as found in a wiring loom.

The term 'embedded conductor' means a conductor that is completely encased in the material in which it is embedded.

The term 'fuse box' as meant here means a receptacle for fuses and/or relays that provides an electrical connection between an inserted fuse or relay and a circuit of the motor vehicle.

It will be appreciated that the plastic panel could include more than one electronic module or could include a fuse box and one or more electronic modules.

Although it is preferred to include a connector as part of the plastic panel, it would be possible to connect the conductors to one or more circuits of the motor vehicle by other means such as, for example, a fly lead. A fly lead is also commonly referred to as a patch cord.

It will be appreciated that the invention could be applied to any plastic panel forming a motor vehicle requiring the fitment of an electronic module and is not limited to use as a bulkhead panel. One advantage of the invention is that it can be applied to structural panels of the motor vehicle and is not limited to use on trim panels thereby increasing the opportunities for use. It will be further appreciated that more than one plastic panel according to the invention could be used on the motor vehicle.

One significant advantage of the invention is that all of the electrical and electronic components can be assembled to the panel before it is fitted to the motor vehicle. The assembly of components in the instrument panel area is ergonomically difficult and time consuming but such assembly is eliminated by using a plastic panel constructed in accordance with this invention.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus comprising:
a vehicle plastic panel defining a module housing;
a connector configured to be retained by the module housing and receive current from a battery; and
a plurality of electrical conductors encapsulated within the panel such that the panel directly contacts an entirety of exterior surfaces of the conductors to electrically insulate the conductors, and configured to selectively route current from the battery and through the connector to fuses in the panel.

2. The apparatus of claim 1 wherein the connector includes a plurality of module connector terminals and each module connector terminal is connected to a respective one of the conductors.

3. The apparatus of claim 2 wherein the module includes a plurality of electrical contacts and each electrical contact cooperates in use with a respective one of the module connector terminals.

4. The apparatus of claim 1 wherein a module retainer is formed integrally with panel, the module retainer engaging the module to retain the module on the panel.

5. The apparatus of claim 1 further comprising an electrical connector at least a portion of which is formed integrally with the panel, the electrical connector connected to the module by the conductors, the electrical connector adapted for mating engagement with a plug to connect the electrical conductors with an electrical circuit external to the panel.

6. The apparatus of claim 5 wherein the electrical connector includes a plurality of terminals and each terminal is connected to a respective one of the encapsulated conductors.

7. The apparatus of claim 6 wherein the terminals are female terminals matingly engageable with male terminals of the plug.

8. Apparatus comprising:
a vehicle plastic panel defining a module connector, disposed on a wall between a vehicle cabin and engine compartment;
an electrical connector formed integrally with the panel and fuses, held by the plastic of the panel; and
multiple electrical conductors encapsulated within the plastic panel such that the panel directly contacts an entirety of exterior surfaces of the conductors to electrically insulate the conductors and electrically connects the fuses with the module connector.

9. The apparatus of claim 8 wherein the module connector includes a plurality of module connector terminals and each module connector terminal is connected to a respective one of the conductors.

10. The apparatus of claim 9 wherein the module includes a plurality of electrical contacts and each electrical contact cooperates in use with a respective one of the module connector terminals.

11. The apparatus of claim 8 wherein a module retainer is formed integrally with panel, the module retainer engaging the module to retain the module on the panel.

12. A vehicle comprising:
a structural panel formed of a single sheet of plastic and configured as a bulkhead of a motor vehicle;
an electrical load disposed within the vehicle;
an electrical connector formed integrally with the panel and having a plurality of terminals held in position by the plastic of the panel, the electrical connector adapted for engagement with a plug associated with a battery, the electrical load and battery each being external to the panel;
a module connector formed integrally with the panel and disposed closer to the electrical load than the electrical connector, wherein the module connector is adapted to make electric connection with an electronic module, and wherein the module connector has a module retainer adapted to engage the electronic module to retain the electronic module on the panel; and
a plurality of electrical conductors encapsulated within the plastic of the panel such that the panel directly contacts an entirety of exterior surfaces of the conductors to electrically insulate the plurality of electrical conductors.

* * * * *